(12) United States Patent
Ramteke et al.

(10) Patent No.: US 11,734,226 B2
(45) Date of Patent: Aug. 22, 2023

(54) DYNAMIC FILE CHUNKING SYSTEM FOR DATA BACKUP

(71) Applicant: Druva Inc., Sunnyvale, CA (US)

(72) Inventors: Ashish Ramteke, Pune (IN); Jagdish Chaudhary, Pune (IN); Kailash Chandak, Pune (IN); Somesh Jain, Pune (IN)

(73) Assignee: Druva Inc., Sunnyvale, CA (US)

( * ) Notice: Subject to any disclaimer, the term of this patent is extended or adjusted under 35 U.S.C. 154(b) by 162 days.

(21) Appl. No.: 17/035,903

(22) Filed: Sep. 29, 2020

(65) Prior Publication Data

US 2021/0216497 A1 Jul. 15, 2021

(30) Foreign Application Priority Data

Jan. 10, 2020 (IN) .............................. 202041001279

(51) Int. Cl.
*G06F 16/11* (2019.01)
(52) U.S. Cl.
CPC .................................. *G06F 16/113* (2019.01)
(58) Field of Classification Search
CPC .................................................... G06F 16/113
See application file for complete search history.

(56) References Cited

U.S. PATENT DOCUMENTS

| | | | | |
|---|---|---|---|---|
| 7,519,635 B1* | 4/2009 | Haustein | ............. | G06F 16/1752 |
| 8,554,735 B1* | 10/2013 | Wible | ................ | G06F 11/1464 |
| | | | | 707/640 |
| 8,676,759 B1* | 3/2014 | Zhu | ..................... | G06F 11/1469 |
| | | | | 707/638 |
| 2008/0133561 A1* | 6/2008 | Dubnicki | .............. | G06F 16/113 |
| 2012/0221527 A1* | 8/2012 | Huang | ................ | G06F 11/1448 |
| | | | | 707/654 |
| 2019/0108099 A1* | 4/2019 | Mazumdar | .......... | G06F 11/1461 |
| 2020/0028931 A1* | 1/2020 | Zhu | ........................ | H04L 65/70 |

* cited by examiner

*Primary Examiner* — Tamara T Kyle
*Assistant Examiner* — Lahcen Ennaji
(74) *Attorney, Agent, or Firm* — IceMiller LLP

(57) ABSTRACT

A system for dynamic file chunking is provided. The system includes a memory and a processor configured to access one or more files to be chunked for a data backup operation and to identify a type of the one or more files. The type of the file is based upon an extension of the respective file. The processor is configured to analyze storage data associated with each type of files corresponding to a plurality of chunking techniques. The processor is configured to associate each of files with a corresponding data chunk size and a chunking technique class based upon the analyzed storage data and to analyze data backup parameters in-real time during the data backup operation and to update at least one of the data chunk size and the chunking technique for each of the type of files based upon the data backup parameters.

15 Claims, 4 Drawing Sheets

DYNAMIC FILE CHUNKING SYSTEM FOR DATA BACKUP

PRIORITY STATEMENT

The present application claims priority under 35 U.S.C. § 119 to Indian patent application number 202041001279 filed 10 Jan. 2020, the entire contents of which are hereby incorporated herein by reference.

FIELD

The invention relates generally to data backup systems, and more particularly to, techniques for dynamic chunking of files during file backup operations.

BACKGROUND

Computer systems may be subjected to various disruptions and failures which may result in loss of data. Data backup systems are employed to perform data backup for such systems either manually or automatically on a periodic basis to prevent loss of data in an event of failure and to facilitate recovery of such data.

In general, files are chunked based on a desirable block chunk size during backup for efficient storage. One way of chunking is static chunking technique, where a block chunk size is determined based on a type of the file. However, exhaustive analysis may be required to determine an optimal chunk size for a particular file type. Typically, chunking techniques may be hard coded for certain file types based on analysis of limited data over a limited time frame. In addition, accuracy in determining the optimal chunk size value for each type of file is dependent on the amount of unskewed data available for analysis. In some cases, the selected chunk size may not be suitable for a customer's needs for backup operations.

Furthermore, any requirement of changing the chunk size for a particular file type may require re-analysis of entire data to estimate the modified chunk size. This process can be substantially cumbersome and cost ineffective.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for dynamic file chunking is provided. The system includes a memory having computer-readable instructions stored therein and a processor configured to execute the computer-readable instructions to access one or more files to be chunked for a data backup operation and to identify a type of the one or more files. The type of the file is based upon an extension of the respective file. The processor is configured to analyze storage data associated with each of the type of files corresponding to a plurality of chunking techniques. The data comprises one or more of performance data, data storage space estimation and cost of maintaining metadata for the files. The processor is further configured to associate each of the type of files with a corresponding data chunk size and a chunking technique class based upon the analyzed storage data and to analyze data backup parameters in-real time for each of the type of files during the data backup operation. The processor is configured to update at least one of the data chunk size and the chunking technique for each of the type of files based upon the data backup parameters.

According to another example embodiment, a data backup system with dynamic file chunking is provided. The data backup system includes a memory having computer-readable instructions stored therein and a processor configured to execute the computer-readable instructions to facilitate real-time chunking of one or more files for backup. The processor is further configured to identify a type of the one or more files. The type of the file is based upon an extension of the respective file. The processor is configured to access a repository to identify an associated data chunk size and a chunking technique for each of the one or more files based on the extension of the respective files. The processor is further configured to analyze data backup parameters in-real time for each of the type of files. The data backup parameters include at least one of number of changed blocks of the files, cost of storage and performance of the data backup operation. The processor is also configured to update at least one of the data chunk size and the chunking technique for each of the type of files based upon the data backup parameters and chunk the files based upon the updated data chunk size and the chunking technique to generate chunked files. The data backup system also includes a data storage platform configured to store the chunked files.

According to another example embodiment, a computer-implemented method for performing dynamic file chunking is provided. The method includes accessing one or more files to be chunked for a data backup operation and identifying a type of the one or more files. The type of the file is based upon an extension of the respective file. The method further includes analyzing storage data associated with each of the type of files corresponding to a plurality of chunking techniques. The data includes one or more of performance data, data storage space estimation and cost of maintaining metadata for the files. The method further includes associating each of the type of files with a corresponding data chunk size and a chunking technique class based upon the analyzed storage data, analyzing data backup parameters in-real time for each of the type of files during the data backup operation and updating at least one of the data chunk size and the chunking technique for each of the type of files based upon the data backup parameters.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
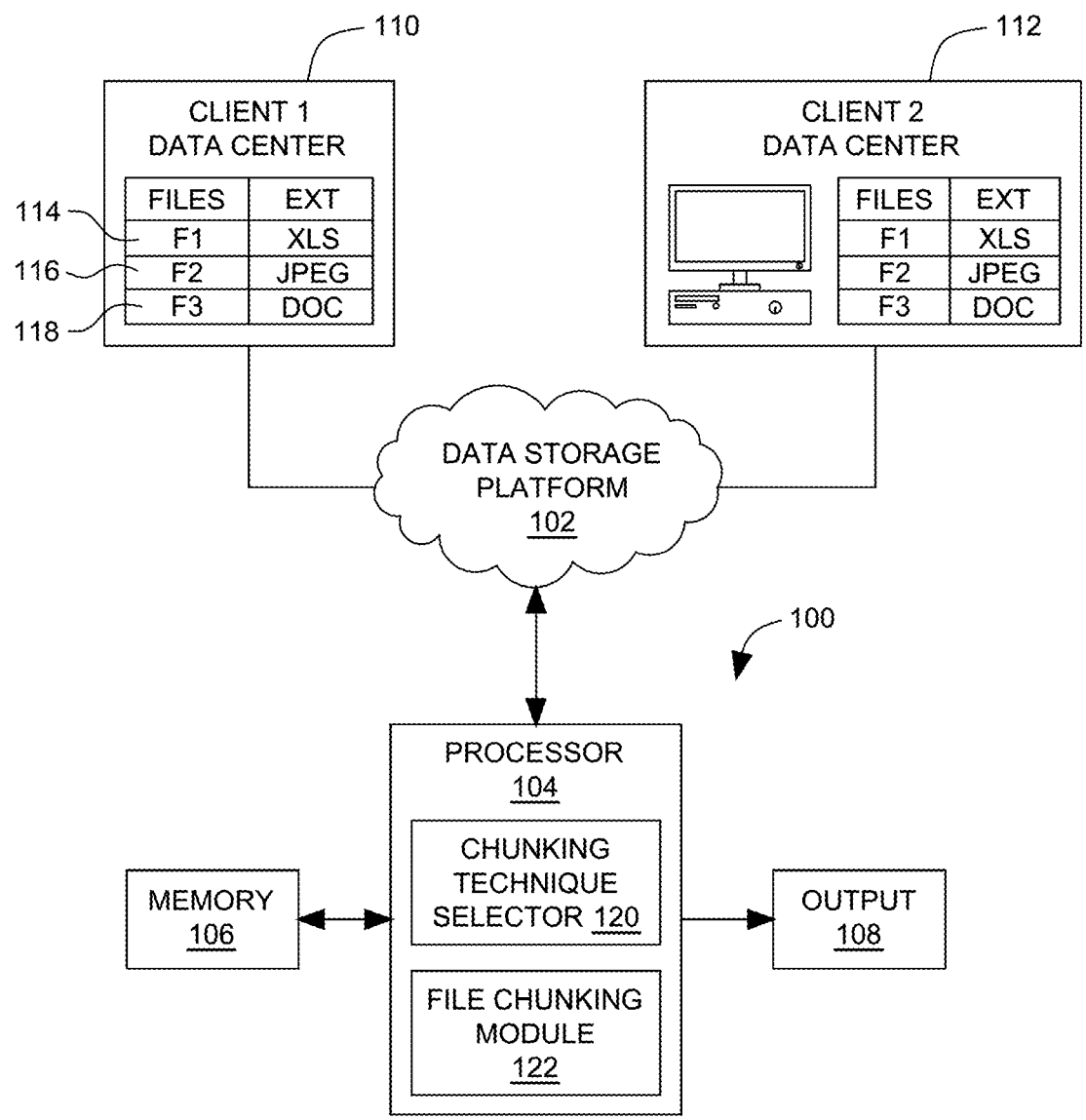
FIG. 1 illustrates a system for dynamic chunking of files for storage in a data storage platform in accordance with embodiments of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments are generally directed to data backup solutions and more particularly to, a system for dynamic block chunking of files during data backup operations. In particular, the techniques described here facilitate dynamic selection of chunking techniques and a respective block size for chunking of files based upon a variety of types of the files along with real-time data backup parameters.

FIG. 1 illustrates a system 100 for dynamic chunking of files for storage in a data storage platform 102 in accordance with embodiments of the present technique. The system 100 includes a processor 104, a memory 106 and an output 108. Each component of the system 100 is described in further detail below.

In the illustrated embodiment, the data storage platform 102 is configured to receive one or more files to be backed up from data centers of clients such as represented by reference numerals 110 and 112. Each of these data centers 110 and 112 may include a plurality of files such as 114, 116 and 118 required to be backed up in the data storage platform 102. Each of these files 114, 116 and 118 may be of different types, such as having a variety of extensions corresponding to the file types. Example extensions may include, but are not limited to, doc, pdf, xls, jpeg, mpeg and so forth. The system 100 is configured to facilitate dynamic chunking of the files 114, 116 and 118 based on the type of files. Moreover, the chunked files may be backed up on the data storage platform 102. The data storage platform 102 may include on-premise data storage site, a private cloud, a public cloud, or combinations thereof.

The processor 104 includes a chunking technique selector 120 and a file chunking module 122. In the illustrated embodiment, the processor 104 is communicatively coupled to the data storage platform 102 and is configured to access the one or more files 114, 116 and 118. In some examples, the processor 104 may be configured to access the files 114, 116 and 118 directly from the client data centers 110 and 112. The chunking technique selector 120 is configured to identify a type of the one or more files 114, 116 and 118 and to dynamically determine a respective chunking technique and data chunk size for each of the one or more files 114, 116 and 118 based on the type of the one or more files 114, 116 and 118. Further, the file chunking module 122 is configured to chunk the one or more files 114, 116 and 118 based on the selected chunking technique and the data chunk size to generate one or more chunked files that are transmitted to the data storage platform 102. In some embodiments, the details of the chunking technique, data chunk size and other relevant metrics may be available to a user of the system via output 108. The selection of chunking technique and the data chunk size will be described below with reference to FIG. 2.

Figure 2:
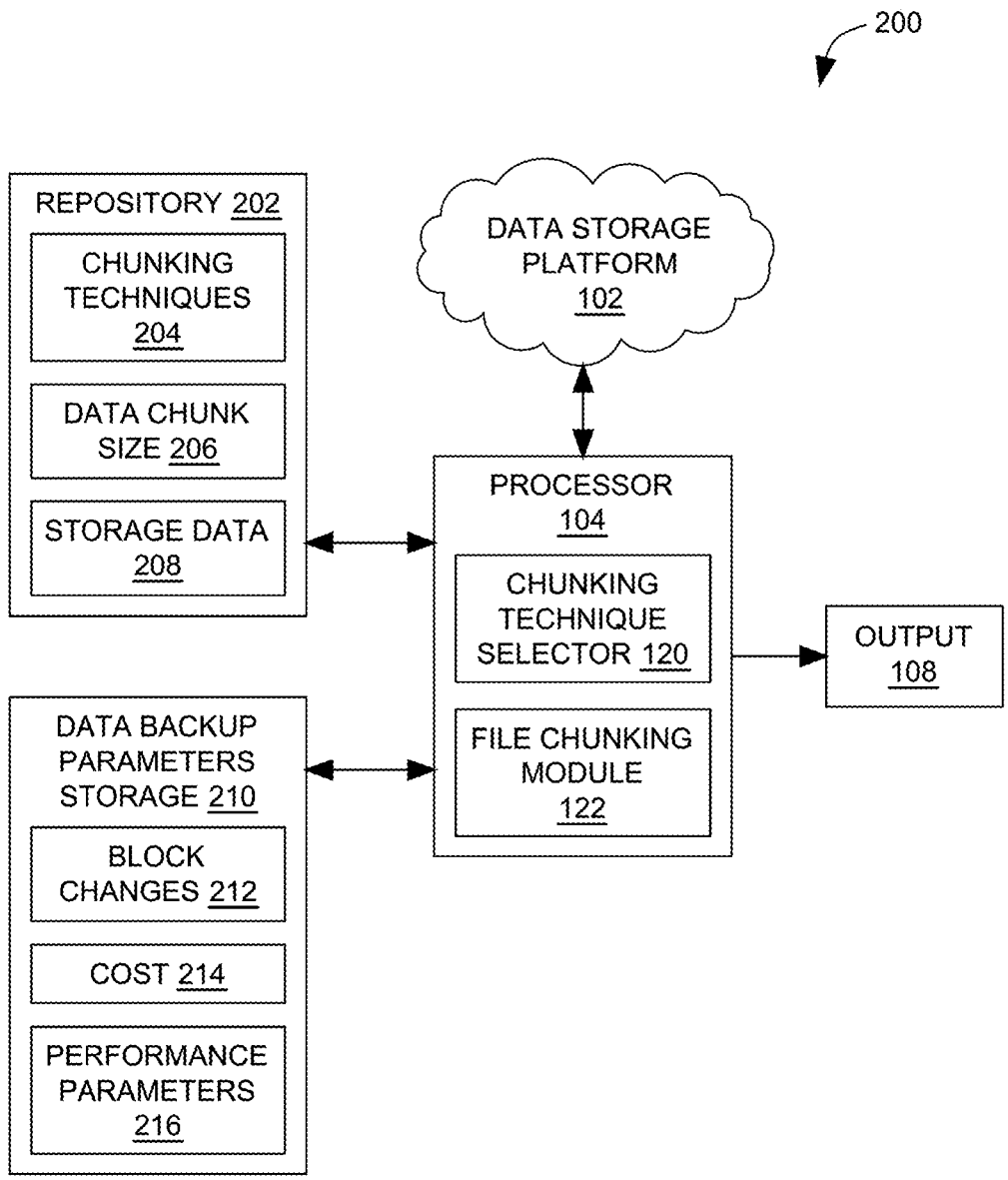
FIG. 2 illustrates an example embodiment of the system of FIG. 1 for dynamic chunking of files in accordance with embodiments of the present technique.

FIG. 2 illustrates an example embodiment 200 of the system 100 for dynamic chunking of files in accordance with embodiments of the present technique. In this embodiment, the processor is configured to facilitate real-time chunking of the one or more files 114, 116 and 118 for backup. The chunking technique selector 120 is configured to identify a type of the one or more files 114, 116 and 118. In this example, the type of each of the files 114, 116 and 118 is based upon an extension of the respective file. Moreover, the chunking technique selector 120 is configured to access a repository 202 to identify an associated data chunk size and a chunking technique for each of the one or more files 114, 116 and 118 based on the extension of the respective files. The repository 202 may include data corresponding to a variety of chunking techniques 204 along with associated data chunk size 206. These may be dynamically updated from time to time by a user of the system 200. In certain examples, based on the files chunked by the processor 104, the details of the chunking techniques 204 and the associated data chunk size 206 may be updated automatically in real-time.

In the illustrated embodiment, the repository 202 further includes storage data 208 associated with each of the type of files corresponding to the plurality of chunking techniques 204. The storage data 208 may include one or more of performance data, data storage space estimation and cost of maintaining metadata for the files. In this embodiment, the chunking technique selector 120 is configured to associate each of the type of files 114, 116 and 118 with a corresponding data chunk size and a chunking technique class based upon the analyzed storage data. In particular, the chunking technique selector 120 is configured to determine the chunking technique and the chunk size to increase the performance, decrease the required storage space and also decrease the cost of maintaining the metadata for the files.

In another embodiment, the chunking technique selector 120 is configured to access data backup parameters from a data backup parameters storage 210. Such parameters include at least one of number of changed blocks of the files 212, cost of storage 214 and performance parameters 216 of the data backup operation.

The chunking technique selector 120 is configured to associate each of the type of files 114, 116 and 118 with a corresponding data chunk size and a chunking technique based upon the analyzed storage data. Moreover, the chunking technique selector 120 is configured to analyze data backup parameters in-real time for each of the type of files 114, 116 and 118 and to update at least one of the data chunk size and the chunking technique for each of the type of files based upon the data backup parameters. Moreover, the file chunking module 122 is configured to chunk the files based upon the updated data chunk size and the chunking technique to generate chunked files that are transmitted to the data storage platform 102 for storage.

In this embodiment, the chunking technique selector 120 is configured to associate each of the type of files 114, 116 and 118 with corresponding data chunk size and a chunking technique class based on the following relationship:

$$F(x,e) = \alpha P_{max}(x,e) - \beta S_{min}(x,e) - \gamma C_{min}(x,e) \quad \text{Equation: 1}$$

Wherein: x ε chunking technique,
e is an extension of the files;
F(x, e) is data chunk size for the extension;
P is the performance data;
S is the data storage space;
C is the cost of maintaining metadata for files; and
α, β, γ are pre-determined weights.

In operation, the chunking technique selector 120 is configured to evaluate a plurality of chunking techniques for each of the type of files 114, 116 and 118 and select a chunking technique corresponding to each type of files based on the following relationship:

$$\text{chunking technique} = x_i | F(x_i, e) = \max(\forall x\ F(x,e)) \text{ where } x \in \text{chunk technique} \quad \text{Equation: 2}$$

In an example, if the storage data is unavailable, then the chunking technique selector 120 is configured to select a pre-set chunking technique corresponding to each type of files 114, 116 and 118. Such pre-set chunking techniques may be stored in the repository 202.

As described above, the chunking technique selector 120 is configured to access the data backup parameters and to analyse such parameters in real time for each type of files 114, 116 and 118 during data backup operations. In this embodiment, the chunking technique selector 120 is configured to estimate the data backup parameters based upon one or more changed blocks of corresponding files during one or more incremental data backups. Moreover, the chunking technique selector 120 is configured to update the data backup parameters for each type of files 114, 116 and 118 and update the data chunk size for each of the type of files 114, 116 and 118. The data chunk size may be updated based on the following relationship:

$$F(x,e) = F(x,e) + \alpha * F'(x,e); \quad \text{Equation: 3}$$

Where: α is the weight of update.

In addition, the chunking technique selector 120 is configured to update the chunking technique for each of the type of files 114, 116 and 118 based upon the updated data backup parameters based on the relationship:

$$\text{chunking technique} = x_i | F(x_i, e) = \max(\forall x\ F(x,e)) \text{ where } x \in \text{chunking technique} \quad \text{Equation 4}$$

As described above, the chunking technique selector 120 is configured to track a variety of parameters in real time and to update at least one of data chunk size and the chunking techniques for each of the type of files 114, 116 and 118 based on such parameters.

In another embodiment, the parameters such as number of changed blocks during backup may be tracked with periodic background analysis of storage data. Here the parameters may be tracked using telemetry across services such as restore check. Other parameters such as cost and performance may be estimated based on a number of blocks changing in incremental backups.

Moreover, the file chunking module 122 is configured to chunk the files 114, 116 and 118 based upon the updated data chunk size and the chunking technique to generate chunked files that are subsequently stored on the data storage platform 102.

In some examples, the chunking technique selector 120 is configured to update the data chunk size and chunking techniques for one or more previously stored on an on-premise storage platform. Such updated information may be stored in the memory 106 of the system 100.

Figure 3:
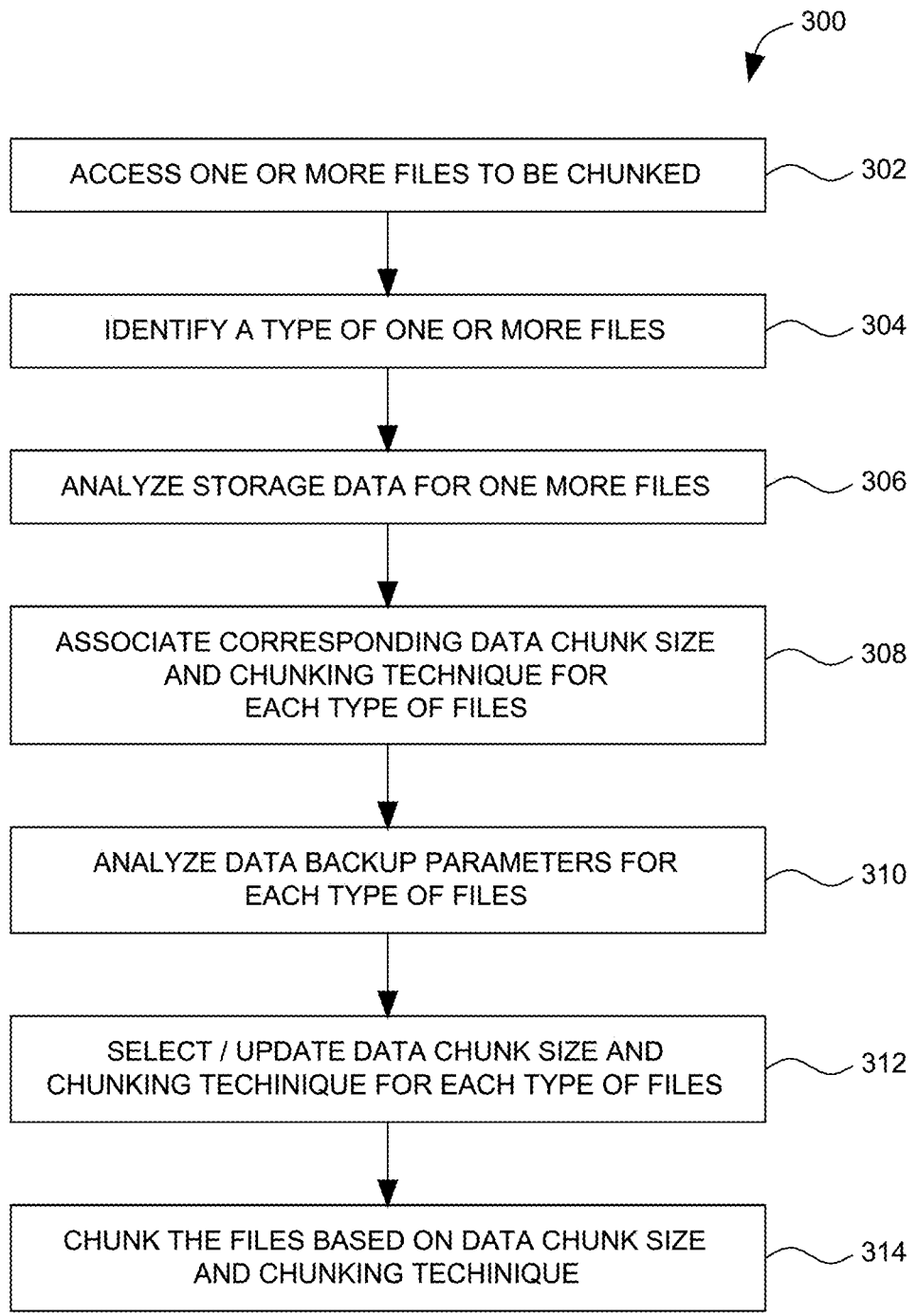
FIG. 3 is a flow diagram for a process for performing dynamic file chunking, using the system, according to the aspects of the present technique.

FIG. 3 is a flow diagram for illustrating a computer-implemented process 300 for performing dynamic file chunking, using the system 100 of FIG. 1, according to the aspects of the present technique. At block 302, one or more files to be chunked for a data backup operation are accessed. The file may be accessed from a data storage platform 102 (FIG. 1). At block 304, a type of the one or more files may be identified by the chunking technique selector 120 of the system of FIG. 1. In this example, the type of the file is based upon an extension of the respective file. In other examples, the types of the files may be identified using other certain parameters. For example, the types of files may be identified based upon MIME type, data classification, file entropy, compressibility and so forth.

Moreover, storage data associated with each of the type of files corresponding to a plurality of chunking techniques is analysed by the chunking technique selector 120 (block 306). Such data includes one or more of performance data, data storage space estimation and cost of maintaining metadata for the files. At block 308, each of the type of files is associated with a corresponding data chunk size and a chunking technique class based upon the analyzed storage data by the chunking technique selector 120. Moreover, data backup parameters are analysed by the chunking technique selector 120 in-real time for each of the type of files during the data backup operation (block 310). In this example, a plurality of chunking techniques for each of the type of files are evaluated by the chunking technique selector 120. Further, a corresponding chunking technique is selected for each of the type of files.

At block 312, at least one of the data chunk size and the chunking technique for each of the type of files are updated by the chunking technique selector 120 based upon the data backup parameters. In this embodiment, the chunking technique selector 120 is configured to access a repository to identify an associated data chunk size and a chunking technique for each of the one or more files based on the extension of the respective files in real-time during a backup operation.

Further, data backup parameters are updated in-real time for each of the type of files. In this example, the data backup parameters include at least one of number of changed blocks of the files, cost of storage and performance of the data backup operation. Moreover, at least one of the data chunk size and the chunking technique are updated for each of the type of files based upon the data backup parameters.

The one or files are chunked in accordance with the selected and/or updated data chunk size and the chunking technique to generate chunked files (block 314). Such chunked files are stored on the data storage platform 102.

Figure 4:
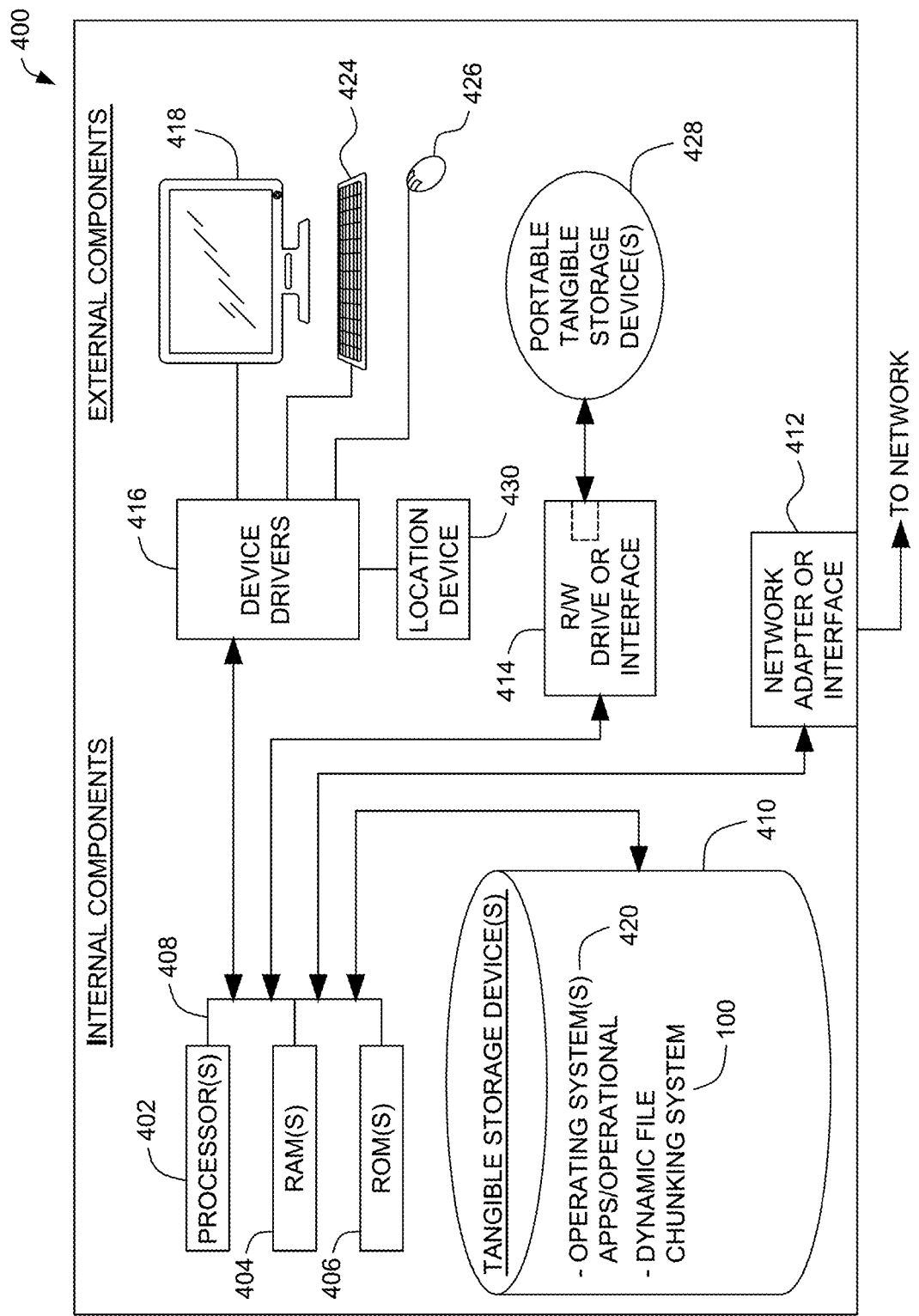
FIG. 4 is a block diagram of an embodiment of a computing device in which the modules of the dynamic file chunking system, described herein, are implemented.

The modules of the dynamic file chunking system 100 described herein are implemented in computing devices. One example of a computing device 400 is described below in FIG. 4. The computing device includes one or more processor 402, one or more computer-readable RAMs 404 and one or more computer-readable ROMs 406 on one or more buses 508. Further, computing device 400 includes a tangible storage device 410 that may be used to execute operating systems 420 and the dynamic file chunking system 100. The various modules of the dynamic file chunking system 100 include, a processor 104, memory 106 and an output 108. Both, the operating system 420 and the storage system 100 are executed by processor 402 via one or more respective RAMs 404 (which typically includes cache memory). The execution of the operating system 420 and/or the system 100 by the processor 402, configures the processor 402 as a special purpose processor configured to carry out the functionalities of the operation system 420 and/or the data backup system 100, as described above.

Examples of storage devices 410 include semiconductor storage devices such as ROM 506, EPROM, flash memory or any other computer-readable tangible storage device that may store a computer program and digital information.

Computing device also includes a R/W drive or interface 414 to read from and write to one or more portable computer-readable tangible storage devices 428 such as a CD-ROM, DVD, memory stick or semiconductor storage device. Further, network adapters or interfaces 412 such as a TCP/IP adapter cards, wireless Wi-Fi interface cards, or 3G or 4G wireless interface cards or other wired or wireless communication links are also included in computing device.

In one example embodiment, the system 100 which includes a processor 104 with the chunking technique selector 120 and the file chunking module 122, and memory 106, may be stored in tangible storage device 410 and may be downloaded from an external computer via a network (for example, the Internet, a local area network or other, wide area network) and network adapter or interface 412.

Computing device further includes device drivers 416 to interface with input and output devices. The input and output devices may include a computer display monitor 418, a keyboard 424, a keypad, a touch screen, a computer mouse 426, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A system for dynamic file chunking, the system comprising:
   a memory having computer-readable instructions stored therein; and
   a processor configured to execute the computer-readable instructions to
      access one or more files to be chunked;
      identify a type of each of the one or more files based upon a detection of an extension of the respective file from among one or more other types of files;
      analyze storage data associated with each of (i) the one or more identified types and (ii) the one or more other types, wherein the analyzed data comprises one or more of performance data, an estimate of data storage space, or a cost of maintaining metadata;
      associate each of the one or more types of files with a selected data chunk size and with a selected chunking technique, the selections being performed by selecting the chunk size and the chunking technique from among one or more other chunk sizes and one or more other chunking techniques, respectively, based upon the analyzed data;
      monitor a set of data backup parameters by tracking a change thereof, respectively for each of the types, wherein each of the parameters indicates a number of changed blocks, a cost of storage, or a performance of a data backup operation;
      responsive to the change, adjust at least one of the associated data chunk size or the associated chunking technique in real-time for the respective type of file;
      generate one or more chunked files based upon the at least one adjustment;
      transmit the one or more generated files to a data storage platform for storage;
   wherein the processor is further configured to:
      update at least one of the data backup parameters; and
      perform the adjustment of the associated data chunk size based on the relationship: $F(x, e)=F(x, e)+\alpha*F'(x, e)$; wherein $\alpha$ is the weight of update.

2. The system of claim 1, wherein the associations are performed based on the relationship:

$$F(x,e)=\alpha P_{max}(x,e)-\beta S_{min}(x,e)-\gamma C_{min}(x,e), \text{ wherein:}$$

x $\varepsilon$ chunking technique,
   e is an extension of the files;
   F(x, e) is data chunk size for the extension;
   P is the performance data;
   S is the data storage space;
   C is the cost of maintaining metadata for files; and
   $\alpha$, $\beta$, $\gamma$ are pre-determined weights.

3. The system of claim 2, wherein the processor is further configured to:
   evaluate a plurality of chunking techniques for each of the types; and
   select a chunking technique corresponding to each of the types based on the relationship:

chunking technique=$x_i|F(x_i,e)=\max(\forall x\ F(x,e))$ where $x\varepsilon$chunk technique.

4. The system of claim 3, wherein the processor is further configured to select a pre-set chunking technique corresponding to each of the types if it is determined that the storage data is unavailable for the files.

5. The system of claim 1, wherein the processor is further configured to estimate the data backup parameters based upon the number of changed blocks of corresponding files during one or more incremental data backups.

6. The system of claim 1, wherein the processor is further configured to perform the adjustment of the associated chunking technique based upon the updated data backup parameters based on the relationship:

chunking technique $x|F(x,e)-\max(Vx\ F(x,e))$ where $x$ z chunking technique.

7. The system of claim 1, wherein the processor is further configured to execute the computer-readable instructions to update the data chunk size and chunking technique for one or more files previously stored on an on-premise storage platform.

8. A data backup system with dynamic file chunking, the system comprising:
   a memory having computer-readable instructions stored therein;
   a processor configured to execute the computer-readable instructions to facilitate real-time chunking of one or more files for backup, wherein the processor is further configured to:
      identify a type of each of the one or more files based upon a detection of an extension of the respective file from among one or more other types of files;
      access a repository to identify an associated data chunk size and an associated chunking technique for each of the one or more files, the identifications being performed by selecting the chunk size and the chunking technique from among one or more other chunk sizes and one or more other chunking techniques, respectively, based on the extension of the respective files;
      monitor a set of data backup parameters by tracking a change thereof, respectively for each of the types, wherein each of the parameters indicates a number of changed blocks, a cost of storage, or a performance of a data backup operation;

responsive to the change, adjust at least one of the associated data chunk size or the associated chunking technique in real-time for the respective type of file;

generate one or more chunked files based upon the at least one adjustment;

transmit the one or more generated files to a data storage platform configured to store the one or more transmitted files;

wherein the processor is further configured to:
update at least one of the data backup parameters; and
perform the adjustment of the associated data chunk size based on the relationship: $F(x, e)=F(x, e)+\alpha*F'(x, e)$; wherein $\alpha$ is the weight of update.

9. The system of claim 8, wherein the processor is further configured to execute the computer-readable instructions to:
analyze storage data associated with each of (i) the one or more identified types and (ii) the one or more other types, wherein the analyzed data comprises one or more of performance data, an estimate of data storage space, or a cost of maintaining metadata, and wherein the associations are performed based upon the analyzed data; and
store the at least one adjustment in the repository.

10. The system of claim 9, wherein the associations are performed based on the relationship:

$$F(x,e)=\alpha P_{max}(x,e)-\beta S_{min}(x,e)-\gamma C_{min}(x,e), \text{ wherein}$$

x ε chunking technique,
e is an extension of the files;
F(x, e) is data chunk size for the extension;
P is the performance data;
S is the data storage space;
C is the cost of maintaining metadata for files; and
$\alpha$, $\beta$, $\gamma$ are pre-determined weights.

11. The system of claim 8, wherein the processor is further configured to perform the adjustment of the associated chunking technique based upon the updated data backup parameters based on the relationship:

chunking technique $x|F(x,e)-\max(Vx\ F(x,e))$ where $x$ z chunking technique.

12. A computer-implemented method for performing dynamic file chunking, the method comprising:
accessing one or more files to be chunked;
identifying a type of each of the one or more files based upon a detection of an extension of the respective file from among one or more other types of files;
analyzing storage data associated with each of (i) the one or more identified types and (ii) the one or more other types, wherein the analyzed data comprises one or more of performance data, an estimate of data storage space, or a cost of maintaining metadata;
associating each of the one or more types of files with a selected data chunk size and with a selected chunking technique, the selections being performed by selecting the chunk size and the chunking technique from among one or more other chunk sizes and one or more other chunking techniques, respectively, based upon the analyzed data;
monitoring a set of data backup parameters by tracking a change thereof, respectively in-real time for each of the types, wherein each of the parameters indicates a number of changed blocks, a cost of storage, or a performance of a data backup operation; responsive to the change, adjusting at least one of the associated data chunk size or the associated chunking technique in real-time for the respective type;
generating one or more chunked files based upon the at least one adjustment;
transmitting the one or more generated files to a data storage platform for storage;
wherein the processor is further configured to:
update at least one of the data backup parameters; and
perform the adjustment of the associated data chunk size based on the relationship: $F(x, e)=F(x, e)+\alpha*F'(x, e)$; wherein $\alpha$ is the weight of update.

13. The computer implemented method of claim 12, wherein the selection of the chunking technique is further based on the type.

14. The computer implemented method of claim 12, wherein the associations are performed based on the relationship:

$$F(x,e)=\alpha P_{max}(x,e)-\beta S_{min}(x,e)-\gamma C_{min}(x,e), \text{ wherein: } s$$

x ε chunking technique,
e is an extension of the files;
F(x, e) is data chunk size for the extension;
P is the performance data;
S is the data storage space;
C is the cost of maintaining metadata for files; and
$\alpha$, $\beta$, $\gamma$ are pre-determined weights.

15. The computer implemented method of claim 12, further comprising:
performing the storage of the one or more generated files on the data storage platform.

* * * * *